J. M. DALY.
METHOD AND APPARATUS FOR STORING AND TRANSPORTING VEHICLES.
APPLICATION FILED FEB. 9, 1916.
1,282,765.
Patented Oct. 29, 1918.
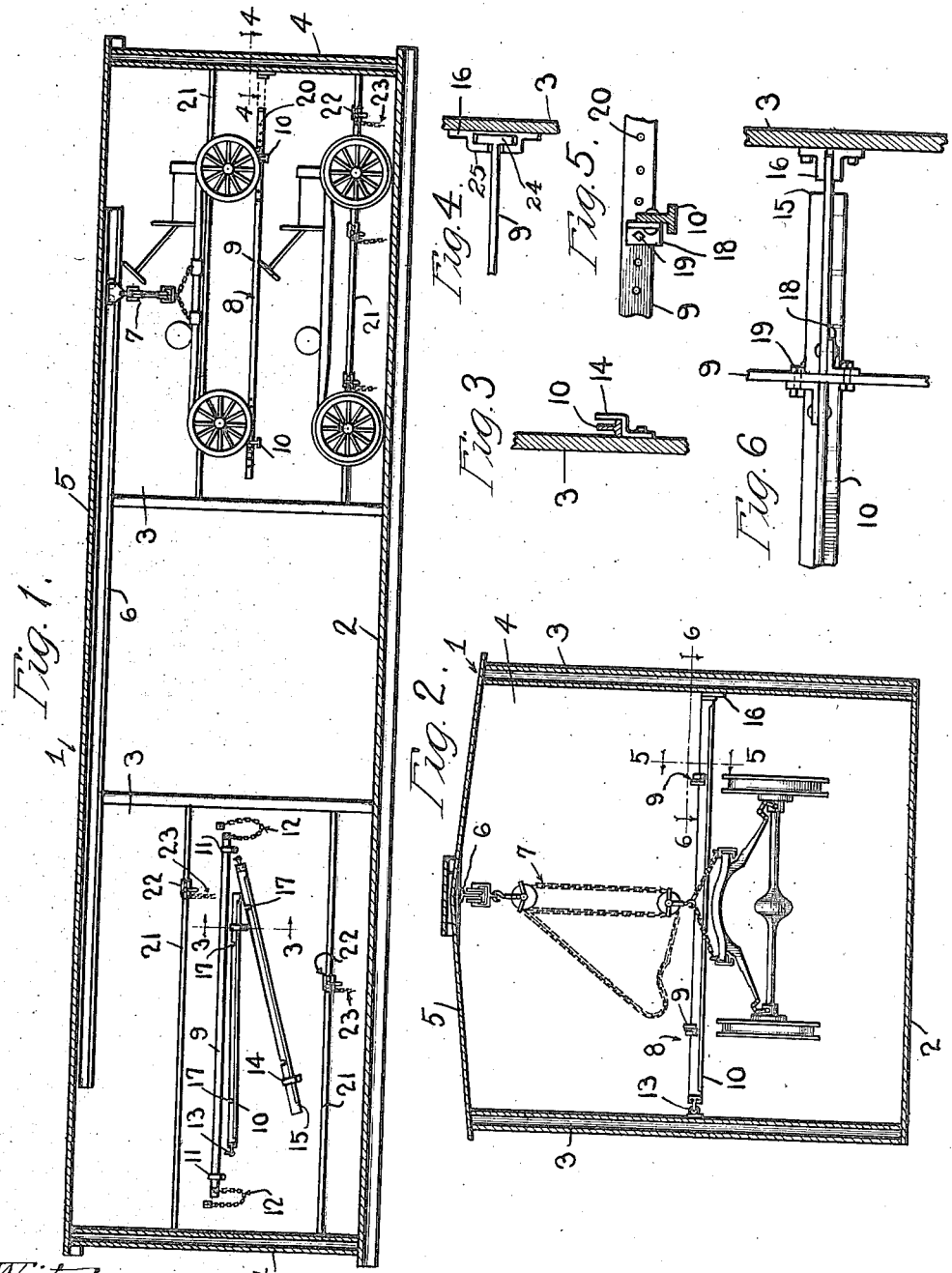

UNITED STATES PATENT OFFICE.

JOHN M. DALY, OF CHICAGO, ILLINOIS.

METHOD AND APPARATUS FOR STORING AND TRANSPORTING VEHICLES.

1,282,765.  Specification of Letters Patent.  Patented Oct. 29, 1918.

Application filed February 9, 1916. Serial No. 77,310.

*To all whom it may concern:*

Be it known that I, JOHN M. DALY, a citizen of the United States, a resident of Chicago, in the county of Cook and State of Illinois, have invented new and useful Improvements in Methods and Apparatus for Storing and Transporting Vehicles, of which the following is a specification.

This invention relates to a method and apparatus for storing and transporting vehicles, and has for one of its objects the provision of a method for the economical loading and transportation of vehicles, particularly motor vehicles in freight cars, being directed to the same art as broadly disclosed and claimed in one of my co-pending applications filed February 9, 1916, Serial No. 77,308.

The invention has for a further object the improving of the present system of loading and transporting vehicles and it contemplates the provision of a car having traveling hoisting means therein for raising and carrying the vehicle within the car and a knock-down supporting frame connected to the walls of the car and having members adapted to engage and support the wheels of the vehicle, the frame being placed in position after the vehicle is raised to its elevated position; it also includes bracing means for engaging the wheels of a vehicle to prevent movement thereof relative to the car.

The apparatus through and by means of which this method of loading, storing and transporting vehicles may be accomplished, includes a car of ordinary construction, or one especially built for the purpose, having a traveling hoisting means, a plurality of knock-down frames adapted to be immovably secured to the walls of the car and having transverse members to engage the wheels of the vehicle and block the same against movement in either direction, and a plurality of longitudinal adjustable members having connection with the walls of the car and adapted to engage the wheels of the vehicles to hold them in fixed position within the car, whereby a plurality of vehicles may be held one above the other in a car, In the drawings, Figure 1 represents a vertical longitudinal cross-section of a car having mechanism installed therein, for accomplishing my new and improved method and embodying my inventions;

Fig. 2 is a vertical transverse cross-section indicating the chassis of a vehicle partially raised within the car;

Fig. 3 is a detailed section on line 3—3 of Fig. 1;

Fig. 4 is a detailed section and top plan view taken on line 4—4 of Fig. 1;

Fig. 5 is a detail section taken on line 5—5 of Fig. 2;

Fig. 6 is a detail section and top plan taken on line 6—6 of Fig. 2.

In the drawings, the numeral 1 designates a freight car, having the floor 2, side walls 3, ends walls 4 and roof 5, this car being of standard construction or as stated before, built especially for this purpose.

Secured to the roof and extending longitudinally of the car is the track 6 for the traveling hoisting means 7, this being of usual construction, the details of which form no part of this invention and application. This is merely a disclosure for the purpose of illustrating any suitable means whereby vehicles may be raised and moved within the car.

For supporting the vehicles in their raised positions so that they may be arranged and transported in tiers or one over the other, I provide a frame 8 which may be knocked down when not in use so as to not interfere with the use of the car for other purposes. This frame includes the pair of longitudinally extending members 9 and the pair of transversely extending members 10, the former being preferably flat bars while the latter are preferably formed of T-iron. These longitudinal members 9 are normally held against the side walls of the car by means of clips 11 and have chains or other flexible means 12 connecting them to the sides of the car to prevent their removal. The transversely extending members of the frame 8 are pivotally connected by means of the eyes 13 to the side walls of the car and are held in position against the side walls of the car when not in use by means of the clips 14, being readily removable therefrom to form the complete frame.

When it is desired to support a vehicle in raised position within the car, the transversely extending members 10 of the frame 8 are removed from the clips 14 and swung to their transverse position, their ends having the horizontal flanges cut away as at 15 so that they fit within the socket members 16 which are secured to the opposite side wall of the car in alinement with the pivotal connection thereof. The longitudinally extending members 9 are then placed on the transverse members 10 and within the recesses 17 therein so that they are held against lateral movement. In order to connect the frame together more securely, I provide the angle braces or brackets 18 which may be riveted to the transverse members 10 and connected to the longitudinal members 9 by means of bolts 19 passing through one of the apertures 20, a plurality of these apertures being provided to permit necessary adjustment.

In connection with this construction, I also provide the bracing means disclosed and claimed in the co-pending application hereinbefore referred to, including the longitudinal track 21, the locking box 22 and the flexible bracing means 23, whereby the wheels of the vehicles either in their elevated position or on the floor of the car, may be effectively braced against movement in any direction.

Referring particularly to Fig. 4, it is seen that I may provide the longitudinal members 9 of the frame with the head pieces 24 which are adapted to fit in the socket member 25 so that the longitudinal members of the frame are locked to the ends of the car.

It is to be noted that when a vehicle is supported in its raised position by means of the frame, that the transverse members 10 form abutments or stops to prevent the forward or rearward movement of the vehicle. It is also seen that the wheels of the vehicle may rest on the longitudinal members 9 of the frame, the transverse members still serving as stops or abutments for the wheels of the vehicle.

It is therefore seen that I have evolved a novel method and simple and efficient means whereby a plurality of vehicles may be loaded within a car and supported one above the other and braced securely and positively against movement within the car so as to prevent damage thereto. The operation of loading and also unloading is simple, and may be accomplished with a minimum expenditure of time and labor.

What I claim is:—

1. The hereindescribed method of storing vehicles in a car, which consists in raising certain of the vehicles to an elevated position within the car and supporting the raised vehicles by means of a frame, positioning other vehicles beneath said raised vehicles, and bracing all the vehicles against movement within the car.

2. The herein described method of storing vehicles in a car, which consists in raising certain of the vehicles to an elevated position within the car and supporting the raised vehicles by means of a frame, the raised vehicles being prevented from movement by parts of the frames, positioning other vehicles beneath said raised vehicles, and bracing all the vehicles against movement within the car.

3. The herein described method of storing vehicles in a car, which consists in raising certain of the vehicles to an elevated position within the car and supporting the raised vehicles by means of a frame, positioning other vehicles beneath said raised vehicles, the frame preventing movement of the raised vehicles within the car, and means for bracing the other vehicles from movement within the car.

4. The herein described method of storing vehicles in a car, which consists in raising certain of the vehicles to an elevated position within the car, providing a frame which may be knocked down for supporting the raised vehicles, said frame preventing movement of the raised vehicles within the car, and positioning and bracing other vehicles beneath said raised vehicles.

5. An apparatus for storing vehicles in a railroad car, including in combination, means for hoisting a vehicle within the car and a frame for supporting said raised vehicle within the car.

6. An apparatus for storing vehicles in a railroad car, including in combination, means for hoisting a vehicle within the car and a frame for supporting said raised vehicle within the car, said frame having means for preventing movement of the vehicle relative thereto.

7. An apparatus for storing vehicles in a railroad car, including in combination, means for hoisting a vehicle within the car and a frame for supporting said raised vehicle within the car, said frame including longitudinal members on which the wheels of the vehicle are adapted to rest and transverse members connecting the longitudinal members which also serve as stops or abutments to prevent movement of the vehicle.

8. An apparatus for storing vehicles in a railroad car, including in combination, means for hoisting a vehicle within the car and a frame for supporting said raised vehicle within the car, said frame including longitudinal members on which the wheels of the vehicle are adapted to rest and transverse members connecting the longitudinal members which also serve as stops or abutments to prevent movement of the vehicle, and means for adjustably connecting the transverse members to the longitudinal members.

9. An apparatus for storing vehicles in a railroad car, including in combination means for hoisting a vehicle within the car and a knock-down frame for supporting said raised vehicle within the car, said frame including longitudinal members on which the wheels of the car are adapted to rest, and transverse members serving as stops or abutments to prevent movement of the car on the frame, and means for connecting the longitudinal members and transverse members, and means for supporting the members of the frame on the walls of the car when disassembled.

10. An apparatus for storing vehicles in a railroad car, including in combination, a traveling hoisting means adapted to raise and convey vehicles to any part of the car, a frame in each end of the car for supporting a vehicle in its raised position and bracing means in each end of the car for bracing the vehicles in position below said raised vehicles.

11. An apparatus for storing vehicles in a railroad car, including in combination, means for hoisting a vehicle within a car, a frame for supporting said raised vehicle in a car, and means for attaching said frame to the sides of the car.

12. An apparatus for storing vehicles in a railroad car, including in combination, means for hoisting a vehicle within a car, a frame for supporting said raised vehicle in the car, means for attaching said frame to the sides of the car, and means for attaching the frame to the ends of the car.

13. An apparatus for storing vehicles in a railroad car, including in combination, means for hoisting a vehicle within a car, and a knock-down frame for supporting said vehicle within the car, said frame including transverse members adapted to be attached to the sides of the car and longitudinal members adapted to rest on said transverse members.

14. An apparatus for storing vehicles in a railroad car, including in combination, means for hoisting a vehicle within a car, a knock-down frame for supporting said vehicle within the car, said frame including transverse members adapted to be attached to the sides of the car, longitudinal members adapted to rest on said transverse members, and means for attaching the ends of said longitudinal members to the ends of the car.

15. In combination in an apparatus of the character described, a frame for supporting vehicles within a car, said frame including longitudinal members on which the wheels of the vehicle are adapted to rest, and transverse members serving as stops or abutments to prevent movement of the vehicle on the frame, and means for connecting the longitudinal and transverse members.

16. In combination in an apparatus of the character described, a frame for supporting vehicles within a car, said frame including longitudinal members on which the wheels of the vehicle are adapted to rest, and transverse members serving as stops or abutments to prevent movement of the vehicle on the frame, means for connecting the longitudinal and transverse members, said transverse members being connected to the sides of the car and said longitudinal members being adapted to be connected to the ends of the car.

17. An apparatus for storing vehicles in a railroad car, including in combination, a knock-down frame for supporting said raised vehicle within the car, said frame including longitudinal members on which the wheels of the vehicle are adapted to rest and transverse members serving as stops or abutments to prevent movement of the vehicle on the frame, means for connecting the longitudinal members and transverse members, said transverse members being pivotally connected to the side of the car and adapted to be attached to the other side of the car.

18. An apparatus for storing vehicles in a railroad car, including in combination, a knock-down frame for supporting said raised vehicle within the car, said frame including longitudinal members on which the wheels of the vehicle are adapted to rest and transverse members serving as stops or abutments to prevent movement of the vehicle on the frame, means for connecting the longitudinal members and transverse members, said transverse members being pivotally connected to the side of the car and adapted to be attached to the other side of the car, and means for attaching the longitudinal members to the ends of the car.

19. An apparatus for storing vehicles in a railroad car, including in combination, means for hoisting a vehicle within the car, a knock-down frame for supporting said vehicle within the car, said frame including a pair of longitudinal members, and a pair of transverse members, one of said pairs of members being formed of T-iron with a vertical flange extending upwardly, and the other of said pairs of members being formed of a flat bar of material resting on said other members.

20. An apparatus for storing vehicles in a railroad car, including in combination, means for hoisting a vehicle within the car, said frame including a pair of longitudinal members and a pair of transverse members, said transverse members being formed of T-iron with a vertical flange extending upwardly and formed with notches to receive said longitudinal members.

21. An apparatus for storing vehicles in a railroad car, including in combination, means for hoisting a vehicle within the car, said frame including a pair of longitudinal members, and a pair of transverse members, one of said pairs of members being formed of T-iron with a vertical flange extending upwardly, and the other of said pairs of members being formed of a flat bar of material resting on said other members, and angle braces connected to said longitudinal and transverse members for holding the frame together.

JOHN M. DALY.